(12) United States Patent
Liulevych et al.

(10) Patent No.: US 8,323,920 B2
(45) Date of Patent: Dec. 4, 2012

(54) METHOD AND SYSTEM FOR MEASURING SINGLE CELL MECHANICS USING A MODIFIED SCANNING PROBE MICROSCOPE

(75) Inventors: Valentyn Liulevych, Davis, CA (US); Gang-yu Liu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 804 days.

(21) Appl. No.: 12/301,685

(22) PCT Filed: Jun. 26, 2007

(86) PCT No.: PCT/US2007/014901
§ 371 (c)(1),
(2), (4) Date: Nov. 20, 2008

(87) PCT Pub. No.: WO2008/002605
PCT Pub. Date: Jan. 3, 2008

(65) Prior Publication Data
US 2009/0263850 A1    Oct. 22, 2009

Related U.S. Application Data

(60) Provisional application No. 60/816,831, filed on Jun. 26, 2006.

(51) Int. Cl.
*C12Q 1/02* (2006.01)
*C12Q 1/00* (2006.01)
(52) U.S. Cl. .............................. 435/29; 435/4
(58) Field of Classification Search ........................ None
See application file for complete search history.

(56) References Cited

U.S. PATENT DOCUMENTS 6,310,342 B1 * 10/2001 Braunstein et al. ............... 850/2

FOREIGN PATENT DOCUMENTS
WO     2008002605 A3     1/2008

OTHER PUBLICATIONS

Lehenkari et al. "New technologies in scanning probe microscopy for studying molecular interactions in cells" (Expert Reviews in Molecular Medicine), 2000, vol. 2, pp. 1-19.*
Trache et al. "Atomic force-multi-optical imaging integrated microscope for monitoring molecular dynamics in live cells", Journal of Biomedical Optics, published online Dec. 29, 2005, vol. 10(6), pp. 064023-1 to 064023-17.*
Vadillo-Rodriguez et al., "Role of lactobacillus cell surfaces by hydrophobicity as probed by AFM in adhesion to surfaces at low and high ionic strength", Colloids and Surfaces B: Biointerfaces, published online Dec. 14, 2004, vol. 41, pp. 33-41.*
Lehenkari et al., "New technologies in Scanning Probe microscopy for studing molecular interactions in cells", Expert Reviews in Molecular Medicine, 2000, vol. 2, pp. 1-19.*
Costa, Kevin, "Single-cell elastography: Probing for disease with the atomic force microscope", Disease Markers 2003, vol. 19, pp. 139-154.*

* cited by examiner

*Primary Examiner* — Laura Schuberg
(74) *Attorney, Agent, or Firm* — Park, Vaughan, Fleming & Dowler LLP; Laxman Sahasrabuddhe

(57) ABSTRACT

One embodiment of the present invention provides a system that measures single cell mechanics using a scanning probe microscope. During operation, the system positions a modified probe of the scanning probe microscope above a cell which is located on a surface, wherein the modified probe is configured with a geometry for compressing the cell. The system then comprises the cell against the surface using the modified probe, thereby causing the cell to deform. Next, the system extracts mechanical properties of the cell from cell deformation behavior and cell response to the compression force.

18 Claims, 5 Drawing Sheets

METHOD AND SYSTEM FOR MEASURING SINGLE CELL MECHANICS USING A MODIFIED SCANNING PROBE MICROSCOPE

BACKGROUND

1. Field of the Invention

The present invention generally relates to the fields of tissue engineering, cellular biology, and disease diagnosis. More specifically, the present invention relates to a method and system for measuring single cell mechanics using a scanning probe microscope with a modified probe.

2. Related Art

The responses of living cells to external forces have attracted recent attention in the fields of tissue engineering, cellular biology and cancer research. For example, during the tissue development and wound healing processes, living cells respond to mechanical stimuli in their native environments with biological changes, such as by altering the shape of membranes and nuclei, cell-spreading, actin and microtubule reorganization or cross-linking under cell membrane, or cell bursting/motility. These changes in turn may alter functional synergy as well as the mechanical behavior of cells. On the other hand, it is known that tumor cells exhibit different elastic compliance compared to normal cells. Hence, the ability to directly measure single cell mechanical properties, such as elasticity and Young's modulus, can be extremely useful for characterizing and controlling the mechanical properties and functions of reconstituted tissues in tissue engineering applications, and for identifying diseased cells.

Motivated by the intriguing molecular mechanism of cell response to mechanical forces, and by demand in tissue engineering and other applications, researchers have developed a significant number of techniques and methodologies during the past two decades to facilitate the metrology of cell mechanical properties, and for the understanding of the underlying biological and structural changes. Some more recently developed techniques for measuring cell mechanics include (a) atomic force microscopy (AFM) based imaging and force measurements, and (b) microdevice-based techniques, such as micropipette aspiration, microforce sensors, and cell poker, among others.

Although AFM was developed in 1986 for high-resolution imaging, AFM has also been used to measure forces in the range of $10^{-5}$ N-$10^{-11}$ N. Existing techniques which use an AFM to measure cell mechanics perform local imaging of cell membrane structures and forces at the nanometer scale. However, it is very difficult to accurately quantify the acquired force images of the tip-cell interaction because of lack of knowledge about tip size, geometry, and functionality, as well as lack of a precise mechanic model at the local level.

Microforce devices use optical microscopy as a position guide and can reveal the cell's mechanical behavior under a local or a global mechanical perturbation. However, these techniques require complicated device fabrication techniques. Furthermore, the spatial resolution of those techniques is limited by the optical diffraction limit, and the involvement of complicated models for data analysis (such as finite element analysis) to correlate force distribution with local and whole cell deformation.

The micropipette aspiration technique has been used to study deformation of individual living cells when they are subjected to extracellular pressure. During operation, each cell is drawn into a glass tube with an inner diameter smaller than the cell height through application of aspiration pressure and the cell deformation is monitored using an optical microscope. Unfortunately, this technique has a number of problems: (1) forces are calculated indirectly from cell shape and applied pressure; (2) cell deformation measurements are limited by the diffraction limit; (3) the cell membrane can be ruptured by the micropipette edge; and (4) for each cell size a proper micropipette diameter has to be selected.

Hence, what is needed is a technique for measuring single cell mechanics without the above-described problems.

SUMMARY

One embodiment of the present invention provides a system that measures single cell mechanics using a scanning probe microscope. During operation, the system positions a modified probe of the scanning probe microscope above a cell which is located on a surface, wherein the modified probe is configured with a geometry for compressing the cell. The system then compresses the cell against the surface using the modified probe, thereby causing the cell to deform. Next, the system extracts mechanical properties of the cell from cell deformation behavior and cell response to the compression force.

In a variation on this embodiment, the system positions the modified probe directly above the center of the cell.

In a variation on this embodiment, the system compresses the cell to cause the cell to deform by compressing the cell to a cell-deformation-level between 0% and 100%, wherein the cell-deformation-level is defined as a ratio of the compression distance to the uncompressed height of the cell.

In a further variation on this embodiment, the system obtains the cell response to the compression force by measuring the force exerted by the deformed cell on the modified probe as a function of the cell-deformation-level.

In a further variation, the compression force applied to the single cell ranges from 1 nN to 50 μN.

In a variation on this embodiment, the system configures the modified probe with a spherical geometry.

In a further variation, the system configures the modified probe by attaching a micro-sphere to a probe of the scanning probe microscope, wherein the micro-sphere has a dimension between 0.1 μm and 100 μm.

In a further variation, the dimension of the micro-sphere is smaller, equal to, or greater than the dimension of the cell.

In a variation on this embodiment, the system monitors the real-time deformation behavior of the cell with an optical microscope.

In a further variation, the system monitors the real-time deformation behavior of the cell by optical signals such as: generating a video to provide a bottom-view of the deformation behavior from a vantage point behind the surface; and generating a video to provide a side-view of the deformation behavior from a vantage point which is perpendicular to the probe.

In a further variation, the deformation behavior can include bursting, blebbing, and bubbling of: the membrane, the cytoskeleton, and the nucleus of the cell in response to the compression force.

In a variation on this embodiment, the system positions the modified probe of the scanning probe microscope above the cell by using an optical microscope to guide the modified probe, wherein the optical microscope illuminates and monitors the cell from the bottom of the cell.

In a further variation, the optical microscope can include: a bright field optical microscope, a fluorescent microscope, and a scanning laser confocal microscope.

In a variation on this embodiment, the system extracts the mechanical properties of the cell from the cell response by extracting the mechanical properties of each constituent of the cell, which includes the membrane of the cell, the cytoskeleton of the cell, the membrane to cytoskeleton attachment, and the nucleus of the cell.

In a variation on this embodiment, the mechanical properties of the cell include Young's modulus, bending modulus, and other mechanical constants of: the membrane of the cell, the cytoskeleton of the cell, and the nucleus of the cell.

In a variation on this embodiment, the scanning probe microscope can include an atomic force microscope (AFM); a near-field scanning optical microscope (NSOM); and a scanning tunneling microscope (STM).

In a variation on this embodiment, prior to positioning the modified probe, the system prepares a plurality of cells on the surface, wherein the plurality of the cells includes the cell.

In a further variation, if the plurality of cells is non-adhesive cells, the system prepares the plurality of cells on the surface by immobilizing the non-adhesive cells using centrifugation and an adhesive film on the surface.

In a variation on this embodiment, the system uses the extracted mechanical properties of the cell to provide a diagnosis of the cell and indicate cell viability.

BRIEF DESCRIPTION OF THE FIGURES

FIG. 5A' illustrates a living cell deformation mechanism modeled by a fluid-filled balloon in accordance with an embodiment of the present invention.

FIG. 5B' illustrates a dead cell deformation mechanism modeled by a fluid-filled balloon with a permeable skin in accordance with an embodiment of the present invention.

FIG. 5C' illustrates a fixed cell deformation mechanism modeled by a hard, permeable rubber ball in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a technique for measuring the mechanical properties of individual cells through single cell compression. Specifically, embodiments of the present invention use scanning probe microscope (SPM) probes which are configured with a specific geometry to precisely apply global forces to individual cells to cause deformation of the cells and to measure the elasticity of each cell from force-deformation relationship with high sensitivity and accuracy. Precise positioning of the SPM probe in relation to each designated cell is achieved by using a high-resolution optical microscopy to guide the probe position. Additionally, the optical microscopy can be used to monitor the cell responses to mechanical stimuli in real-time with high spatial resolution.

The proposed single cell compression technique can achieve a wide range of cell-deformation by applying a wide range of compression force, wherein both cell-deformation and compression force can be directly and precisely measured. Consequently, a full force response of the compressed cell can be obtained, which is then used to extract the mechanical properties of each constituent of the cell, including the membrane, the cytoskeleton, the membrane to cytoskeleton attachment, and the nucleus of the cell. Note that the mechanical properties can include Young's modulus, bending modulus, and other mechanical constants of these constituents of the cell. The force response is sensitive to biological properties and structural changes of the cell, such as the cell's viability, as well as the cross-linking of membrane and cytoskeletal proteins composition.

Single Cell Compression System

Figure 1A:
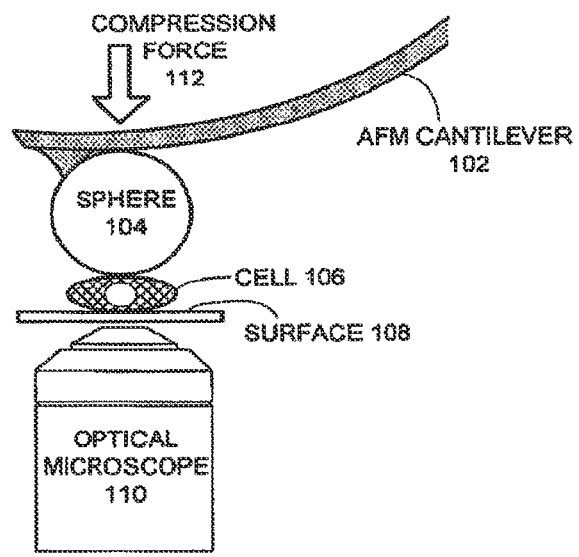
FIG. 1A presents a schematic of a single cell compression system in accordance with an embodiment of the present invention.

FIG. 1A provides a schematic of a single cell compression system 100 in accordance with an embodiment of the present invention.

As illustrated in FIG. 1A, single cell compression system 100 comprises an atomic force microscopy (AFM) cantilever 102, wherein the probe of AFM cantilever 102 is modified to have a spherical geometry. Specifically, a micro-sphere 104 with a greater than or equal to 0.1 μm diameter is attached, for example, by gluing, to the original probe of cantilever 102. In particular, sphere 104 is glued to an inner sidewall of the cantilever probe as is shown in FIG. 1A. As a result, the modified cantilever probe is configured with the spherical geometry. Note that sphere 104 can be attached to an alternative sidewall of the AFM probe. Alternatively, sphere 104 can be attached directly to the underside of cantilever 102 and near the tip of cantilever 102. In one embodiment of the present invention, sphere 104 is made of glass. In some other embodiments, sphere 104 can be made of materials other than glass.

Prior to performing cell compression, sphere 104 is positioned directly above a designated cell 106 which is prepared over a solid surface 108, for example, a surface of a glass slide. In one embodiment of the present invention, cell 106 is disposed on a thin adhesive film that is coated over surface 108. Note that sphere 104 is positioned directly above the center of cell 106. In doing so, system 100 can prevent cell 106 from being pushed off laterally during subsequent cell compression processes.

To achieve a precise positioning of sphere 104 above cell 106, one embodiment of the present invention uses a high-resolution inverted optical microscope 110, which monitors the bottom of cell 106 behind the glass slide which holds cell 106. During probe positioning, optical microscope 110 illuminates cell 106 to guide the AFM cantilever 102 to position the probe tip, i.e., the bottom of sphere 104, directly above the center of cell 106. Note that optical microscope 110 for guiding the probe can include, but is not limited to a bright field optical microscope, a fluorescent microscope, and a scanning laser confocal microscope.

During a single cell compression operation, positioned sphere 104 is driven toward surface 108 along the vertical direction with a predetermined speed and precision. In one embodiment of the present invention, the compressing speed is selected to avoid both cell movement that can occur at low compression speed and hydrodynamic force contribution which becomes significant at a high compression speed. As illustrated in FIG. 1A, the downward movement of sphere 104 applies a compression force 112 that presses cell 106 against surface 108. Compression force 112 causes cell 106 to deform and stretch along the lateral direction (i.e., from a near spherical shape into an oblate spheroid shape). In one embodiment of the present invention, compression force 112 is precisely controlled to cover a wide range, from 1 nN to 500N. This force range allows full compression of a wide range of cell types, from soft brain cells (N2A) to hard skin cells (keratinocyte).

In one embodiment of the present invention, the deformation of cell 106 can be quantified in terms of compression distance. Note that, based on this definition, the deformation range of cell 106 can be determined from a "zero deformation" corresponding to a zero separation between the cell and the sphere to a "complete deformation" which corresponds to the original height of cell 106. In one embodiment of the present invention, an intermediate deformation can be computed using the expression: deformation=(z-distance change)−(cantilever deflection), wherein z-distance change refers to downward movement of the vertical AFM pizeo-scanner, and cantilever deflection refers to the deflection distance of the cantilever caused by the force response of cell 106. Note that, as an alternative to moving cantilever 102 against cell 106 using the AFM scanner, system 100 can also affix cell holder to the AFM scanner, which then moves cell 106 upward against cantilever 102 which is held static.

System 100 also measures the force exerted by deformed cell 106 on sphere 104 as a function of the cell deformation, which can be used to produce a "force-deformation curve." Note that this force-deformation curve is unique to the compressed cell, and can be used to extract mechanical properties of the cell, such as elasticity and permeability information. In one embodiment of the present invention, the zero separation between the sphere and the cell is determined at the point of the first detectable force by the AFM.

In one embodiment of the present invention, the diameter of sphere 104 is chosen to be smaller, equal to, or larger than the size of cell 106, which is typically between 5 µm to 50 µm. Note that using a larger size sphere to compress a smaller size cell mimics a global compression of a cell between two parallel plates (i.e., between sphere 104 and surface 108). Typically, the sphere diameter can be between 0.1 µm and 100 µm.

Note that the process of configuring the AFM probe for single cell compression is not limited to using a sphere. Hence, other geometries can be used in place of sphere 104. For example, one can use an oblate sphere, a semi-sphere, or other non-spherical geometries.

Figure 1B:
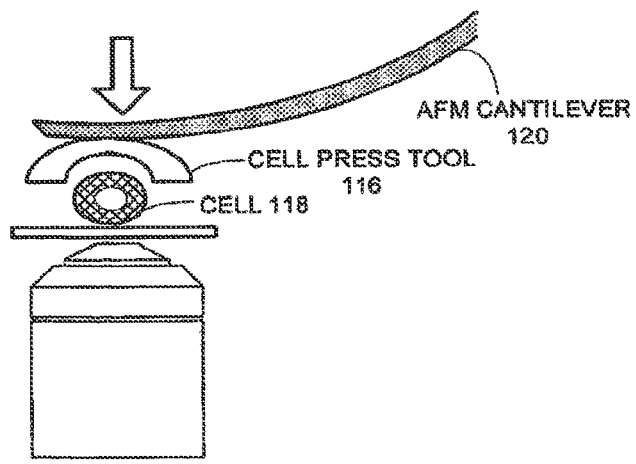
FIG. 1B presents a schematic of a single cell compression system wherein an AFM cantilever probe is configured with a cell press tool having an indented geometry in accordance with an embodiment of the present invention.

FIG. 1B presents a schematic of a single cell compression system 114 wherein an AFM cantilever probe configured with a cell press tool 116 having an indented geometry in accordance with an embodiment of the present invention. Note that the geometry of cell press tool 116 is designed to hold down a designated cell 118 during a cell compression operation, which is desirable for compressing nonadherent cells that typically have lateral instability when subjected to a compression force. Also note that in this embodiment, cell press tool 116 is directly attached to the underside of the AFM cantilever 120.

Because cell size can vary in a wide range, each force-deformation curve can have a different deformation range if an absolute deformation is used. Hence, one embodiment of the present invention uses a "relative deformation" to quantify the cell deformation. Specifically, relative deformation $\epsilon$=(cell-height-change)/ (initial-cell-height), wherein cell-height-change equals the compression distance in the vertical direction and initial-cell-height refers to the uncompressed cell height.

In one embodiment of the present invention, initial-cell-height is determined as a calibration step before each new cell measurement. Specifically, initial-cell-height of a designated cell is determined as a difference between a first initial-contact-point associated with force curves taken on a clean surface and a second initial-contact-point associated with force curves taken on the designated cell prepared on the clean surface. In one embodiment, the force curves taken on the clear surface are also used for the surface hardness check. Note that relative deformation $\epsilon$ is between 0 and 1, regardless of the cell size.

Note that because the cell compression system of FIG. 1A facilitates a full range of cell compression, each force-deformation curve contains mechanics information of the entire cell, for example, the elasticity and permeability of the whole membrane and cell interior. We describe a technique of extracting these mechanical properties in more detail below.

Note that compression force 112 applied to cell 106 can be computed using Hooke's Law $F=k\Delta$, wherein F is the compression force, k is the force constant of the AFM cantilever configured with sphere 104, and d is the deflection of AFM cantilever 102. The cantilever deflection $\Delta$ can be determined by means of a laser spot photodetector inherent to the AFM, or any other commonly used cantilever deflection detection techniques. We describe how the force constant k can be obtained for a cell-compression cantilever in the example below. Note that compression force 112 equals the force exerted by the deformed cell on sphere probe 104 and cantilever 102 under a static or a constant speed compression process.

Note that AFM probes serve a number of functions during the process of measuring cell compression force response: (1) single-cell compression; (2) force sensing; and (3) high-resolution imaging. Meanwhile, optical microscope 110 provides both in-situ and real-time video monitoring of cell deformation and major changes in cell organelles such as bursting, blebbing, and bubbling of the membrane, the cytoskeleton, and the nucleus of the cell in response to cell compression.

Note that in addition to monitoring the cell deformation process in real-time from a vantage point behind surface 108, an optical microscope can also be positioned at a vantage point perpendicular to the vertical direction to provide a side view of the real-time cell deformation.

Note that although we discussed the single cell compression technique in the context of an AFM-based system, other scanning probe microscopes (SPMs) can be used in single cell compression system 100, which can include, but are not limited to, a scanning tunneling microscope (STM) and a near-field scanning optical microscope (NSOM). For each type of SPM that can be used for single cell compression, the tip of the SPM probe may be configured with a spherical geometry in the same manner as the AFM probe 102.

Note that each cell-pressing object attached to the SPM probe can be made from various materials, such as polymers or glass. Furthermore, embodiments of the present invention allow performing surface chemistry modification to each cell-pressing object so that the surface properties of the object can be modified. For example, the object surface can be functionalized with specific types of molecules to adjust hydrophobicity/hydrophilicity properties. Different types of cell-pressing objects can create different types of force interactions with the designated cells, which facilitate the investigation of different cell properties, such as cell adhesion and cell signaling.

In one embodiment of the present invention, instead of using sphere 104 for single-cell compression, sphere 104 can be configured to pull cell 106 upward and subsequently a pulling force-deformation correlation can be established.

Cell Preparation

Cells used for cell compression measurements are typically spread on a glass slide in a single cell layer. In particular, adherent cells spread on the glass slide automatically adhere to the surface and remain at the same location during the compression process. However, nonadherent cells move around without adhering to a specific location on the surface. One embodiment of the present invention immobilizes nonadherent cells on a surface using an adherent layer on the surface. These immobilized cells then remain at the same locations when being compressed. We describe an exemplary cell immobilization procedure below.

Jurkat T lymphoma cells (T cells) transfected with pMH-Neo are cultured in Dulbecco's media (Invitrogen) plus 10% fetal bovine serum. Upon determining the initial cell density, the cells are subjected to culture media removal by centrifugation (250 g, room temperature, 5 min) and subsequent decantation. The cell pellet is resuspended in serum-free Dulbecco's modified Eagle's medium (DMEM) media to a final concentration of $1 \times 10^6$ cells/mL. For live cell studies, one million prepared lymphocytes are pipetted into a sterile glass-bottom dish (WillCo-dish, 0.17 mm) coated with 1 mg/mL of poly-L-lysine (Sigma). Typically, 1%-5% surface cell coverage is observed upon 5 min, 250 g centrifugation. These immobilized cells can remain alive for about 2 hours after deposition and exposure to ambient conditions. The samples are then transferred to an AFM for force-deformation measurements.

When fluorescent or confocal imaging is performed in conjunction with AFM force response studies, cells are pretagged via membrane CM-DIL (Molecular Probes, V22888, ex/em 553/570 nm) and nuclei Vybrant DyeCycle violet (1 mM, Molecular Probes V35003, ex/em 405/450 nm). Cells are soaked in 10 μL of Vybrant CM-DIL (1 mM) dye and incubated for 30 min (37° C. and 5% $CO_2$). Cell solutions are introduced above poly-L-lysine coated cover slips after rinsing with 1× phosphate-buffered saline (PBS) (pH 7.3, EM Science) and being resuspended in serum-free DMEM media. In double-labeled cells, the second dye, 2 μL of Vybrant DyeCycle violet (1 mM), is administered in addition to the CMDIL. Keeping immobilized cells for more than 2 hours outside the incubator led to the death of 50%-100% of the cell population, and these cells are used to measure the single-cell compression of dead cells. For the investigations of fixed cells, 4% paraformaldehyde (eBioscience) is added to cells immobilized on the poly-L-lysine coated glass surfaces. The fixative solution is removed within 40 minutes and replaced with 1×PBS prior to AFM/confocal microscopy studies.

An Exemplary Cell Compression System

Figure 2A:
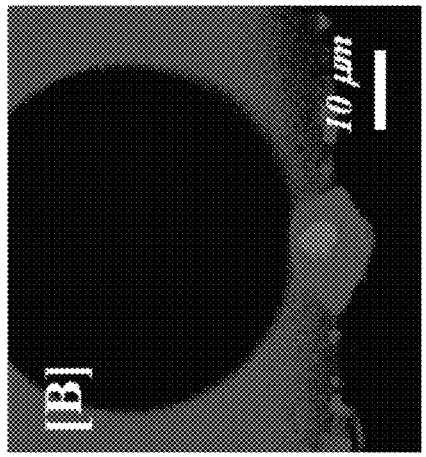
FIG. 2A presents an electron microscopy image of an AFM probe with a 40 μm glass sphere glued to the end of the AFM cantilever in accordance with an embodiment of the present invention.

One embodiment of the present invention provides a single cell compression system comprising an MFP-3D AFM (Asylum Research Corp.), which is equipped with a nano-positioning sensor for monitoring actual piezo-scanner motion and correcting piezo-hysteresis and creeping. In this embodiment, a specific type of cantilever is chosen based on the cell elasticity. Specifically, two types of silicon cantilevers (Olympus) are used: (a) AC240 with a force constant of k=1.0 N/m, and (b) AC160 with a force constant of k=40 N/m. For each selected AFM cantilever, a glass sphere (diameter=40 μm, Duke Scientific) is attached to the apex of the cantilever probe using a premixed two-component epoxy (PC-SUPREPOXY). FIG. 2A presents an electron microscopy image of an AFM probe with a 40 μm glass sphere glued to the end of the AFM cantilever in accordance with an embodiment of the present invention.

After configuring the AFM cantilever with the sphere, the new spring constant of the modified cantilever is recomputed using an added mass method (Cleveland, J. P.; Bocek, D.; Hansma, P. K., Rev. Sci. Instrum. 1993, 64, pp. 403-305) and the results are in good agreement (within 15% for the AC240 cantilever and 30% for the AC160 cantilever) with values obtained from thermal noise measurements (Walter, D. A, et. al., Rev. Sci. Instrum. 1996, 67, pp. 3583-3590 and Butt, H. J.; Jaschke, M., Nanotechnology 1995, 6, 1-7).

Prior to performing cell compression, force curves are acquired in bare surface areas to take into account possible substrate contributions. It has been observed that while using large glass spheres, the contribution from the substrate is insignificant, regardless of the presence of thin coatings on the surface.

The AFM can be integrated with an inverted optical microscope (IX80, Olympus America) or a scanning laser confocal microscope (Fluoview 1000, Olympus America). Optical microscopy can be used to guide the movement of the AFM cantilever to position the glass sphere directly above the center of a designated cell, and to monitor the deformation of the cell membrane and nucleus when force is applied to the cell by the AFM. In one embodiment, cell compression experiments are performed in conjunction with a bright-field optical microscopy (IX50, Olympus) which is used to prevent staining and tagging the cells. In cases when high optical resolution is required to visualize the three-dimensional cellular structure and components, scanning laser confocal microscopy can be used to image cells stained with designated dyes.

In one embodiment of the present invention, the probe is moved with speeds ranging from 2 μm/s to 20 μm/s, and with a precision of 0.3 nm. The speed range is selected to avoid cell movement (at low compression speed) or hydrodynamic force contribution (significant at high speed). At 20 µm/s, the hydrodynamic drag is on the order of 2 nN, which is within experimental uncertainty. Because the diameter of the glass sphere is significantly larger than the sizes of the cells (5 µm-10 µm), the acquisition of this force-compression distance curve in AFM mimics the global compression of a single cell between two parallel plates.

Figure 2B:
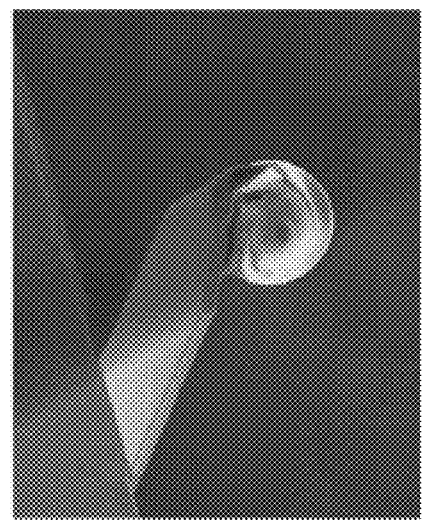
FIG. 2B presents a confocal microscope snapshot illustrating the side view of compressing a cell with the sphere of the AFM probe in accordance with an embodiment of the present invention.

FIG. 2B presents a confocal microscope snapshot illustrating the side view of compressing a cell with the sphere of the AFM probe in accordance with an embodiment of the present invention. Note that the image illustrates a cell compression process that shows the AFM probe being positioned directly above the center of an immobilized T cell. Note that the nucleus of the T cell is clearly visible in the confocal microscope.

Figure 2C:
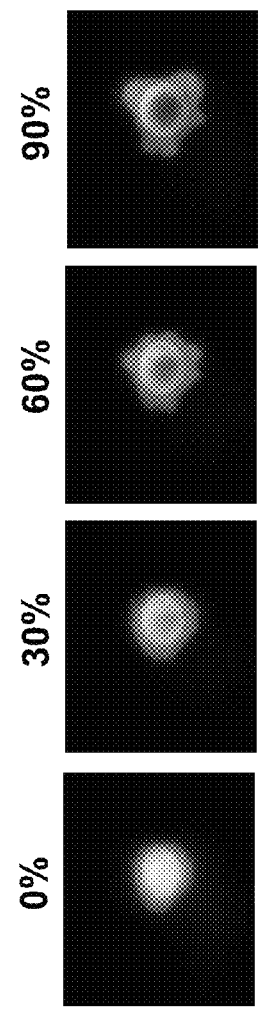
FIG. 2C presents a series of bottom view confocal microscope snapshots illustrating the process of cell deformation under compression by a sphere in accordance with an embodiment of the present invention.

FIG. 2C presents a series of bottom view confocal microscope snapshots illustrating the process of cell deformation under compression by a sphere in accordance with an embodiment of the present invention. These snapshots are selected frames of a high resolution video that captures the cell deformation in situ and in real time during a compression cycle.

Specifically, FIG. 2C is composed of four stages of a human-skin-cell (keratinocyte cell) fill compression cycle, from 0% deformation to 100% deformation. Note that these snapshots capture an increasing amount of cell membrane deformation. Also note that the high resolution optical monitoring of the cell deformation reveals creation of bubbles from the cell membrane at high deformation range. In one embodiment of the present invention, the number and size of the bubbles created at a given deformation level can be used to diagnose disease cells. For example, healthy cells with good membrane attachment typically create small size bubbles in a large number. In contrast, disease cells, such as a cancer cell with poor membrane attachment, typically create a single large bubble.

Figure 3:
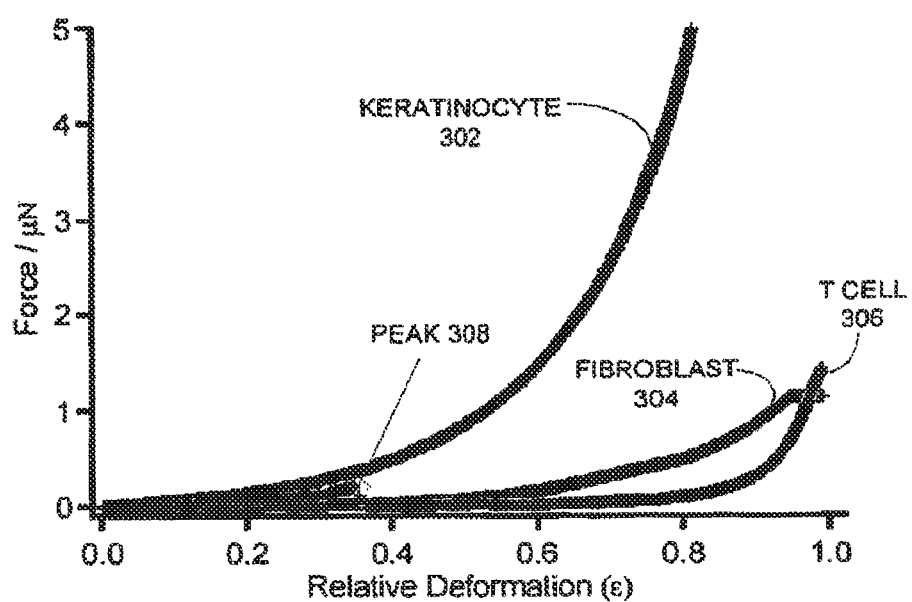
FIG. 3 illustrates cell force-deformation curves of different human living cell types obtained using the single cell compression system in accordance with an embodiment of the present invention.

FIG. 3 illustrates cell force-deformation curves of different human living cell types obtained using the single cell compression system in accordance with an embodiment of the present invention.

As shown in FIG. 3, the force-deformation curve of human skin cells (keratinocyte cell 302) demonstrates a stronger force response than epithelia cells (fibroblast cell 304) and blood cells (T cell 306). Furthermore, the living keratinocyte cell 302 and fibroblast cell 304 display no deformation peaks because they have stronger cytoskeleton structures in comparison with T cell 306 (which displays a peak 308 at 30% deformation).

Force Response of Living Cells vs. Dead Cells

Figure 4A:
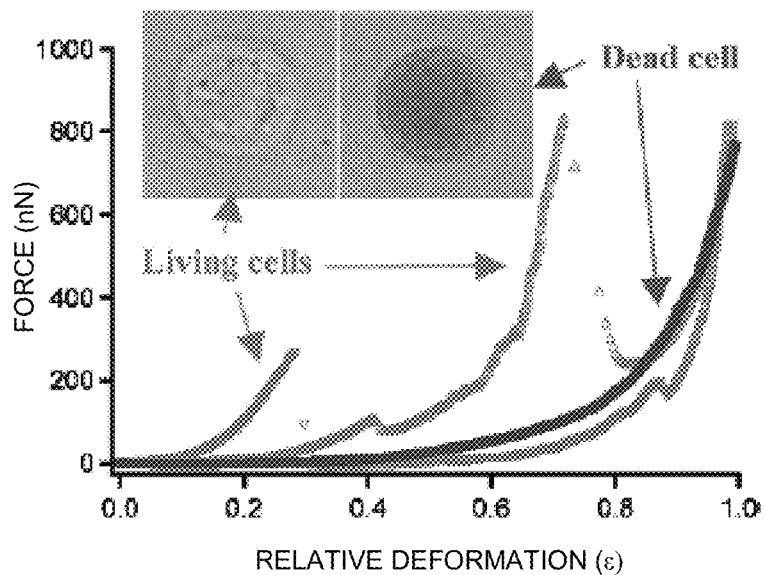
FIG. 4A illustrates a number of typical force-deformation curves of living cells and one force-deformation curve of dead cells obtained using the single cell compression system in accordance with an embodiment of the present invention.

FIG. 4A illustrates a number of typical force-deformation curves of living cells and one force-deformation curve of dead cells obtained using the single cell compression system in accordance with an embodiment of the present invention. Insets of FIG. 4A show the two types of cells upon the addition of 10 µL of 4% trypan blue solution, wherein the dead cells turn blue under an optical microscopy.

To obtain each of the force-deformation curves in FIG. 4A, a large number of cells are measured and each curve represents typical results (>80%) of all the single cell measurements. The green curves shown in FIG. 4A represent typical force-deformation curves acquired from single-cell compression measurements for living cells. Because the same cantilever is used for all cell compression, and the AFM/confocal microscope combination enables precise probe-cell alignment, the difference in the force response reflects the individuality of the cells. Despite cell variations, common characteristics can be observed from the single-cell compression profiles of the living cells.

Note that at low applied compression, the cell deformation ($\epsilon \sim 0.2$-0.3) is elastic and fully reversible. This suggests that cell membranes remain impermeable. Mathematically, this portion of the force curve can be fitted using $\epsilon^3$, which is explained using a simple model below. The deformation region of $\epsilon \sim 0.3$-0.8 is characterized by the appearance of stress peaks in the force-deformation curves. In this region, the responses become highly nonlinear with very little reversibility. The cell membrane is likely bursting at the first peak, causing leakage of cell fluid and a drop in cell pressure. Most leukemia T cell bursts occur at about 30% deformation with observed cell rupturing force ranges from 0.1 µN to 0.3 µN. The complexity in force response by various cellular components is revealed by the appearance of multiple peaks after membrane rupture. Beyond 80% of deformation, the slope of the force curve increases rapidly, reaching micronewton forces. It can be inferred that this region is a characteristic of further loss of intracellular contents as well as deformation of the remaining cell components, including the nucleus. The presence of multiple peaks is characteristic of cell behavior, which is in contrast to microcapsules. Prolonged exposure to ambient conditions without cell-growth media typically leads to cell death. The viability of the cells is checked using trypan blue exclusion. Living cells do not uptake the dye molecules and thus remain their natural color. In contrast, dead cells are permeable, which turns dead cells blue under optical microscopy (refer to the inset in FIG. 4A).

The blue curve in FIG. 4A is the force-deformation curve of the dead cells. Note that the blue curve exhibits a distinctively different force response from that of the living cells. Note that the force-deformation profile of dead cells is smooth in contrast to the living cell curves which typically comprise multiple stress peaks. Furthermore, there are less cell variations or individuality in the compression profiles of dead cells compared to those of living cells, and the process becomes irreversible beyond 20% deformation.

At high cell deformation regions, the curves become very similar among cells, regardless of their initial viability, which is consistent with the above discussion of the force curve for the living cells. Mathematically, the curves at the small deformation region can no longer be fitted using $\epsilon^3$, but rather follow a $\epsilon^{3/2}$ relationship. Note that the compression profiles of dead cells have no analogy among artificially engineered structures such as capsules.

Force Response of Fixed Cells

Figure 4B:
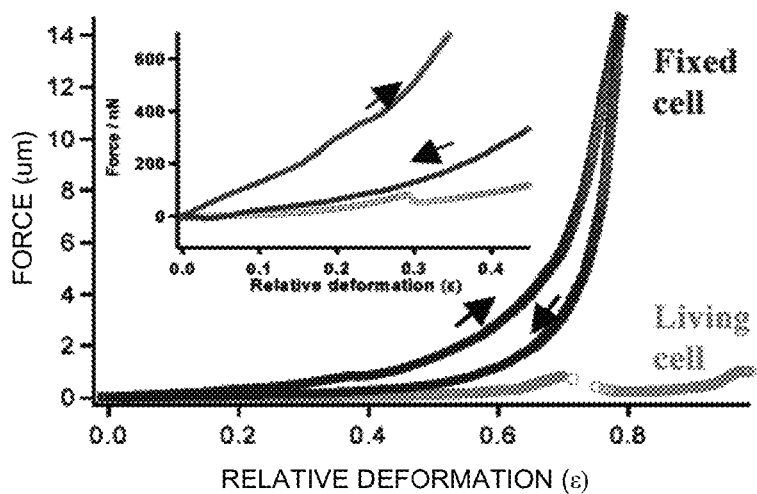
FIG. 4B illustrates typical force-deformation curve for a single fixed cell during compressing and uncompressing cycles in accordance with an embodiment of the present invention.

FIG. 4B illustrates typical force-deformation curve (red) for a single fixed cell during compressing and uncompressing cycles in accordance with an embodiment of the present invention. Note that the fixed cell profile is co-displayed with a typical living cell profile during the loading process (green). The inset in FIG. 4B zooms into the small deformation region of both profiles.

To obtain the fixed cells, cell fixation solution is introduced onto a glass slide after the living cells have been immobilized on the glass slide. Note that the force required to compress the fixed cells is at least 20-50 times higher than that for the living or the dead cells in FIG. 4A. In contrast to the living cells, fixed cells exhibit a smooth deformation profile without rupture points or irregularities, and also display a full reversibility, even after more than 60% deformation of 20 consecutive loading and unloading cycles. In comparison with the living and dead cells, fixed cells demonstrate less adhesion to the compressing sphere. These observations are consistent with the significant alteration of cell components during the fixation process. More specifically, aldehyde groups react with primary amines in membrane and cytoskeletal proteins to form covalent imine bonds. The cross-linking of proteins dramatically changes the elasticity and the mechanical behavior of these cells.

Extracting Mechanical Properties of Living Cells

Figure 5:
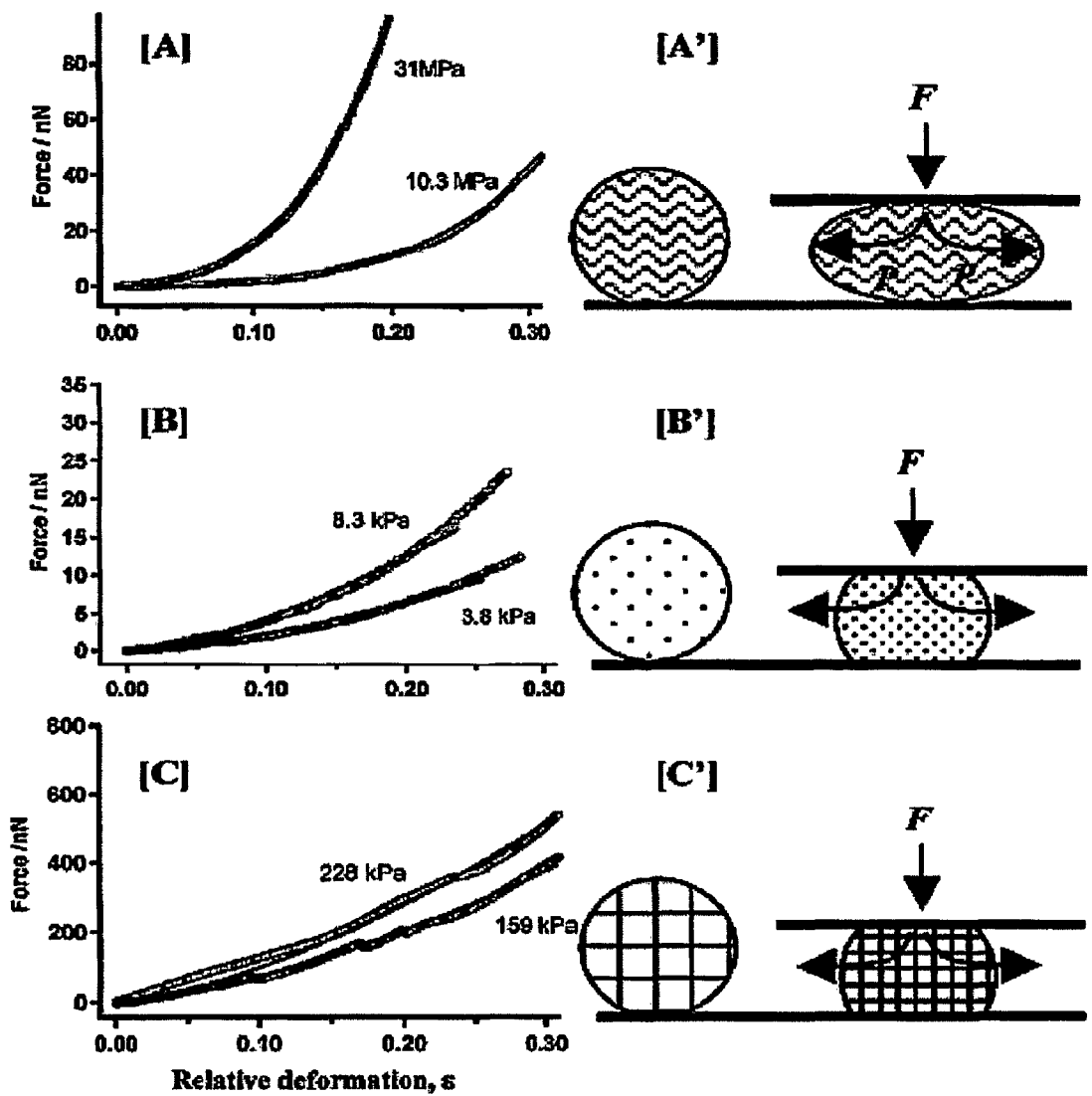
FIG. 5A illustrates least-squares fitting of the force-deformation curves of living cells using Eq. 3 in accordance with an embodiment of the present invention.
FIG. 5B illustrates least-squares fitting of the force-deformation curves of dead cells using Eq. 6 in accordance with an embodiment of the present invention.
FIG. 5C illustrates least-squares fitting of the force-deformation curves of fixed cells using Eq. 6 in accordance with an embodiment of the present invention.

FIG. 5 illustrates the process of fitting the force-deformation curves in FIGS. 4A-4B to extract mechanical properties of the corresponding cells in accordance with an embodiment of the present invention.

As mentioned above in conjunction with FIG. 4A, the measured force-deformation curves of the living cells follow a cubic relationship with respect to deformation ($\epsilon^3$) at low compression force. This observation can be rationalized with a simple mechanical model, from which the elasticity of a cell membrane can be quantified analytically.

FIG. 5A' illustrates a living cell deformation mechanism modeled by a fluid-filled balloon in accordance with an embodiment of the present invention. Because living cells are generally impermeable (which is verified with trypan blue experiments in FIG. 4A), a living cell can be modeled using a balloon filled with an incompressible fluid, as shown in FIG. 5A'.

During the compression process, the balloon maintains a constant volume because of the impermeability of the boundary. Inner fluid transduces the compression pressure homogeneously in all directions, and as a result, the balloon shell (i.e., the cell membrane) balances the pressure by stretching (to increase surface area). Bending deformation may also occur, which is localized at the contact area. Using this model, the force and cell deformation may be correlated using a relatively simple model as:

$$F_m = F_{stretching} + F_{bending} \qquad (Eq. 1)$$
$$= 2\pi \frac{E_m}{1-v_m} hR_0\varepsilon^3 + \pi \frac{E_m}{2\sqrt{2}} h^2 \varepsilon^{1/2}$$

wherein $R_0$ and h are the radius of the uncompressed cell and membrane thickness, respectively, while $E_m$ and $v_m$ represent the Young's modulus and Poisson ratio of the cell membrane, respectively. The ratio between the bending and stretching terms can be calculated using:

$$\frac{F_{bending}}{F_{stretching}} \approx \frac{h}{R} \frac{1}{\varepsilon^{5/2}} \qquad (Eq. 2)$$

Given that the lipid bilayer thickness (h) is typically 4 nm, while the cell radius is above 5 μm, this ratio is below 0.05 at small deformations ($\epsilon$=0.1-0.3). Therefore, one can neglect the small bending deformation term in Eq. 1, which becomes:

$$F_m \approx 2\pi \frac{E_m}{1-v_m} hR_0\varepsilon^3 \qquad (Eq. 3)$$

Note that this cubic dependence of force on deformation is stronger than the Hookian spring ($F \propto \epsilon$) or the Hertzian contact ($F \propto \epsilon^{3/2}$). The physical basis of such dependence is the collective of the entire membrane stretching caused by pressure transduced by the incompressible cell liquid during compression. Using Eq. 3 to fit the force-deformation curves of living cells allows the single-cell elasticity to be extrapolated.

FIG. 5A illustrates least-squares fitting of the force-deformation curves of living cells using Eq. 3 in accordance with an embodiment of the present invention. As illustrated by the two curves in FIG. 5A, the fitting matches well at small deformations, with a standard deviation of ±0.4 MPa. Assuming the Poisson ratio v=1/2 for the cell membrane, that is, it is incompressible, the extracted Young's modulus of the membrane ranges from 10 MPa to 35 MPa for the measured cell compression profiles. This value is comparable to the Young's modulus of highly elastic polymers (typically 1 MPa-100 MPa), and in agreement with the Young's modulus of the protein-coated lipid vesicles in the micropipette studies, which was found to be 10-20 MPa.

When the Young's modulus is obtained, the bending constant $K_m$ of the membranes of living cells can be computed using:

$$F_m \approx \frac{E_m h^3}{12(1-v_m^2)} \qquad (Eq. 4)$$

yielding $K_m$=(17-52) kT (k=1.38×10-23 J/K, T=300 K). This value is 3-5 times smaller than the previously estimated membrane bending modulus for dictyostelium cells.

Extracting Mechanical Properties of Dead Cells With and Without Fixation

FIG. 5B' illustrates a dead cell deformation mechanism modeled by a fluid-filled balloon with a permeable skin in accordance with an embodiment of the present invention. This mechanical model can be used to describe the compression behavior of dead and fixed cells.

Using this model, during single-cell compression fluid may be squeezed out, at which point the membrane stretching term becomes insignificant. Under these compression conditions, the hydrodynamic contribution of the liquid squeezed from the cell may be neglected because little force-speed dependence is observed. The bending of the membrane of the cell and cell interior compression (e.g., cytoskeleton and nucleus) are the main contributions to the force-deformation correlation. The small bending of the spherical membrane can be estimated following the example of living cells (see Eq 1):

$$F_m = \pi \frac{E_m}{2\sqrt{2}} h^2 \varepsilon^{1/2} \qquad (Eq. 5)$$

wherein h is the membrane thickness, $E_m$ is the membrane Young's modulus, and $\epsilon$ represents deformation. For dead cells at $\epsilon$=0.3, and using $E_m$=30 MPa and h=4 nm, the force calculated from Eq. 5 is less than 1 nN, which is much less than the observed compression force. This suggests that the cell membrane bending is also insignificant. In another word, the mechanics of dead cells is dictated by the compression of the cell interior rather than the compression of the cell membrane.

Because the diameter of the compressing sphere (D=40 μm) is much larger than the typical diameter of the cells (~5 μm), the contact deformation is analogous to a cell compressed between two glass slides, wherein the glass is much more rigid than the cell. Hence, the deformation of cells, according to the Hertzian theory can be calculated using:

$$F_i \approx \frac{\sqrt{2}\,E_i}{3(1-v_i^2)} R_0^2 \varepsilon^{3/2} \quad \text{(Eq. 6)}$$

wherein $R_0$ represents the cell radius before deformation, and $E_i$ and $v_i$ are the Young's modulus and Poisson ratio of the whole cell's interior, respectively.

FIG. 5B illustrates least-squares fitting of the force-deformation curves of dead cells using Eq. 6 in accordance with an embodiment of the present invention. At 30% deformation or less, fitting the force-deformation curves of the dead cells using Eq. 6 allows the extraction of the cell elasticity. As illustrated in FIG. 5B, the Young's modulus of the cell primarily attributed to the cytoskeleton is 4-7.5 kPa (for v=0, that is, fully compressible material). The standard deviation of these fitting is ±0.2 kPa. The resulting elasticity is in good agreement with the cytoskeleton or cell nucleus (1–10 kPa) as estimated from other cell mechanics studies.

FIG. 5C' illustrates a fixed cell deformation mechanism modeled by a hard, permeable rubber ball in accordance with an embodiment of the present invention. It is known that, during the cell fixation process, aldehyde groups from the fixative react with primary amines in the membrane and cytoskeletal proteins to form covalent imine bonds. The cross-linking of proteins dramatically changes the elasticity and the mechanical behavior of cells (see FIG. 4B). These changes cause the dramatic increase in cell elasticity, i.e., the fixed cells are almost 20-50 times more rigid than living cells.

Additionally, the compression can no longer rupture the cells to cause irreversible responses during compressing and uncompressing cycles. In other words, the cell deformation is completely reversible for these fixed cells. The bending force (Eq. 5) contribution of the cross-linked cell membrane is less than 10 nN, even assuming a Young's modulus of membrane of 1 GPa. Hence, the bending contribution can be ignored. The single-cell mechanics is therefore similar to that of dead cells without fixation based on the fact that the cell mechanics is dictated by the cytoskeleton instead of the membrane.

FIG. 5C illustrates least-squares fitting of the force-deformation curves of fixed cells using Eq. 6 in accordance with an embodiment of the present invention. The least-squares fitting of the force curves using Eq. 6 (derived from the Hertzian model) yields a Young's modulus of these cells in the range of 150-230 kPa. As shown in FIG. 5C, the fitting has a standard deviation of ±1.2 kPa.

Conclusion

The present invention provides a high precision, high sensitivity single-cell compression technique for acquiring information on molecular-to-microscopic level structural changes of cells, such as the cross-linking of proteins within the cytoskeleton, cell bursting, membrane elasticity, and permeability.

The proposed single-cell compression technique does not require complicated probe manufacturing and is not limited by optical diffraction limits in deformation determination. During compression, the proposed technique facilitates precise control of cell deformation, compression forces, speed of compression, and direct and independent real-time force and deformation measurements. Additionally, the present invention allows compression of a whole cell up to 100%, and hence the force-deformation curve contains information about the whole membrane and cell interior, such as elasticity and permeability information.

The proposed single-cell compression technique further allows measuring a large number of cells (either of the same type or different types) in a short period time. This high speed measurement capability provides a practicality for performing statistical analysis.

The reproducibility in single-cell compression experiments demonstrates that an AFM-based positioning technique combined with independent high-resolution optical monitoring can provide high accuracy in cell positioning, mechanical perturbation, and force-deformation measurements. Furthermore, the present invention uses simple analytical models to fit force-deformation curves, and then extracts mechanical properties of the compressed cells from the fitted curves.

Note that in addition to measuring single-cell mechanics, the single-cell compression technique may be used to investigate mechanical properties of bacteria, viruses, organelles, tissues, and organs.

The present invention finds more applications in:

Tissue engineering: the mechanical matching between cells and extra cellular matrix is one of the key requirements in tissue engineering;

Disease diagnosis: the present invention can provide an alternative, fast, and non-invasive approach to disease diagnosis, e.g., healthy and cancerous cells exhibit different mechanical properties;

Fundamental research in cellular biology: the present invention can provide a direct and simple means to aid those research activities;

Theoretical study of cellular mechanics using finite element methods: the present invention can provide directly measured force-deformation data of whole cells for comparison with these finite element simulations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for measuring single cell mechanics using a scanning probe microscope, comprising:
    positioning a modified probe of the scanning probe microscope above a cell which is located on a surface, wherein the modified probe is configured with a geometry for compressing the cell, and wherein the horizontal dimension of the geometry is greater than the size of the cell;
    globally compressing the cell against the surface in the vertical direction using the geometry; and
    extracting mechanical properties of the cell from cell deformation behavior and cell response to the compression force.

2. The method of claim 1, wherein positioning the modified probe of the scanning probe microscope involves positioning the modified probe directly above the center of the cell.

3. The method of claim 1, wherein compressing the cell to cause the cell to deform involves compressing the cell to a cell-deformation-level between 0% and 100%, wherein the cell-deformation-level is defined as a ratio of the compression distance to the uncompressed height of the cell.

4. The method of claim 3, further comprising obtaining the cell response to the compression force by measuring the force exerted by the deformed cell on the modified probe as a function of the cell-deformation-level.

5. The method of claim 4, wherein the compression force applied to the single cell ranges from 1 nN to 50 μN.

6. The method of claim 1, wherein the modified probe is configured with a spherical geometry.

7. The method of claim 6, wherein the modified probe is configured by attaching a micro-sphere to a probe of the scanning probe microscope, wherein the micro-sphere has a dimension between 0.1μm and 100μm.

8. The method of claim 1, wherein while compressing the cell to cause the cell to deform, the method further comprises monitoring real-time deformation behavior of the cell with an optical microscope.

9. The method of claim 8, wherein the real-time optical deformation monitoring involves:
   generating a video to provide a bottom view of the deformation behavior from a vantage point behind the surface; or
   generating a video to provide a side view of the deformation behavior from a vantage point which is perpendicular to the probe.

10. The method of claim 1, wherein the deformation behavior can include bursting, blebbing, and bubbling of: the membrane, the cytoskeleton, and the nucleus of the cell in response to the compression force.

11. The method of claim 1, wherein positioning the modified probe of the scanning probe microscope above the cell involves using an optical microscope to guide the modified probe, wherein the optical microscope illuminates and monitors the cell from the bottom of the cell.

12. The method of claim 11, wherein using the optical microscope can involve using:
   a bright field optical microscope;
   a fluorescent microscope; and
   a scanning laser confocal microscope.

13. The method of claim 1, wherein extracting the mechanical properties of the cell from the cell response involves extracting the mechanical properties of each constituent of the cell, which includes:
   the membrane of the cell;
   the cytoskeleton of the cell;
   the membrane to cytoskeleton attachment; and
   the nucleus of the cell.

14. The method of claim 1, wherein the mechanical properties of the cell include Young's modulus, bending modulus, and other mechanical constants of:
   the membrane of the cell;
   the cytoskeleton of the cell; and
   the nucleus of the cell.

15. The method of claim 1, wherein the scanning probe microscope can include:
   an atomic force microscope (AFM);
   a near-field scanning optical microscope (NSOM); and
   a scanning tunneling microscope (STM).

16. The method of claim 1, wherein prior to positioning the probe, the method further comprises preparing a plurality of cells on the surface, wherein the plurality of the cells includes the cell.

17. The method of claim 16, wherein if cells in the plurality of cells are non-adhesive cells, preparing the plurality of cells on the surface involves immobilizing the non-adhesive cells using centrifugation and an adherent film on the surface.

18. The method of claim 1, further comprising using the extracted mechanical properties of the cell to provide a diagnosis of the cell and indicate cell viability.

* * * * *